United States Patent
Ozawa et al.

(10) Patent No.: US 8,962,720 B2
(45) Date of Patent: Feb. 24, 2015

(54) RUBBER COMPOSITION FOR GOLF BALL

(75) Inventors: Yuichiro Ozawa, Chichibushi (JP); Tsuyoshi Nakajima, Chichibushi (JP); Teppei Mori, Kodaira (JP); Yusuke Yamagata, Kodaira (JP); Takahiro Iwai, Kodaira (JP)

(73) Assignees: Bridgestone Sports Co., Ltd., Tokyo (JP); Bridgestone Corporation, Tokyo (JP)

( * ) Notice: Subject to any disclaimer, the term of this patent is extended or adjusted under 35 U.S.C. 154(b) by 109 days.

(21) Appl. No.: 13/300,847

(22) Filed: Nov. 21, 2011

(65) Prior Publication Data
US 2013/0131236 A1   May 23, 2013

(51) Int. Cl.
| | | |
|---|---|---|
| A63B 37/12 | (2006.01) | |
| A63B 37/06 | (2006.01) | |
| A63B 37/00 | (2006.01) | |
| C08K 5/3447 | (2006.01) | |
| C08L 9/00 | (2006.01) | |
| C08K 5/09 | (2006.01) | |
| C08K 5/14 | (2006.01) | |
| C08K 5/378 | (2006.01) | |

(52) U.S. Cl.
CPC .......... C08K 5/3447 (2013.01); C08K 5/09 (2013.01); C08K 5/14 (2013.01); C08K 5/378 (2013.01)
USPC ........... 524/106; 524/323; 524/351; 524/352; 524/349; 473/378; 473/385; 473/351

(58) Field of Classification Search
CPC ........ A63B 37/12; A63B 37/06; A63B 37/00; C08K 5/3447; C08L 9/00
USPC .......... 524/106, 323, 351, 352, 349; 473/378, 473/385, 351
See application file for complete search history.

(56) References Cited

U.S. PATENT DOCUMENTS

| 6,921,345 B2 | 7/2005 | Higuchi et al. | |
|---|---|---|---|
| 2006/0004171 A1* | 1/2006 | Tsuji et al. | 528/25 |
| 2011/0028246 A1* | 2/2011 | Kimura | 473/383 |

FOREIGN PATENT DOCUMENTS

| JP | 2002-3653 A | 1/2002 |
|---|---|---|
| JP | 2002-355339 A | 12/2002 |

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

The invention provides a rubber composition for golf balls which includes (A) a base rubber containing a polybutadiene having a cis-1,4 bond content of at least 60 wt %, (B) an unsaturated carboxylic acid and/or a metal salt thereof, and (C) a benzimidazole of general formula (1) or (2) below

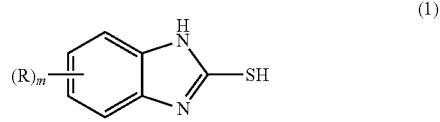

(1)

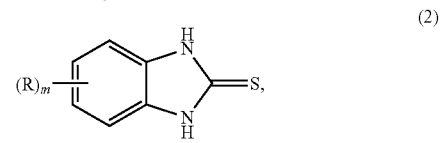

(2)

wherein R is a hydrogen atom or a hydrocarbon group of 1 to 20 carbons, and m is an integer from 1 to 4, with the proviso that if m is 2 or more, each occurrence of R may be the same or different.

The golf ball rubber composition of the invention enables a high-quality molded and crosslinked product having a suitable hardness and a high resilience to be obtained.

3 Claims, No Drawings

RUBBER COMPOSITION FOR GOLF BALL

BACKGROUND OF THE INVENTION

The present invention relates to a rubber composition for use in one-piece golf balls and, for example, the cores of solid golf balls such as two-piece golf balls and multi-piece golf balls. More specifically, the invention relates to a rubber composition which, in a molded and crosslinked form, has a suitable hardness and a good resilience, and is thus ideal as a golf ball material.

One-piece golf balls, and the solid cores of two-piece golf balls and multi-piece golf balls which are composed of a solid core encased, either directly or over an intervening intermediate layer, by a cover, are generally obtained by vulcanizing a rubber composition containing as the base material a rubber component such as polybutadiene and containing also, for example, an unsaturated carboxylic acid metal salt such as zinc acrylate and an organic peroxide.

The unsaturated carboxylic acid metal salt serves primarily as a co-crosslinking agent or a crosslinking aid in the rubber composition, and is known to have a large influence on the crosslink structure and crosslink density of the rubber.

Peroxide crosslinking is employed to crosslink rubber, and is carried out using one or more organic peroxide. The field of golf balls contains much recent prior art that employs two or more organic peroxides by making use of the difference in the decomposition temperatures of the organic peroxides. A variety of research exists on such peroxide crosslinking.

In addition to these organic peroxides and unsaturated carboxylic acid metal salts, various types of additives, such as antioxidants, sulfur, organosulfur compounds, inert fillers and zinc stearate, are also suitably included in such rubber compositions for golf balls in order to improve the physical properties and characteristics thereof.

However, golf ball users are highly demanding and so further improvements in performance are desired. There is an especially strong desire for improvements in rebound, which directly affects the flight performance.

Prior-art references which relate to the present invention include the following.

Patent Document 1: JP-A 2002-355339
Patent Document 2: JP-A 2002-003653

SUMMARY OF THE INVENTION

It is therefore an object of the present invention to provide, based upon further investigations on various additives which are included in rubber compositions, a rubber composition for golf balls which increases the resilience of the composition when molded and crosslinked and also enables a molded and crosslinked product of suitable hardness to be obtained.

The inventors have conducted intensive investigations, as a result of which they have discovered that, in the preparation of a rubber composition for a one-piece solid golf ball or for a core or portion of a solid golf ball having a cover of one, two or more layers, when a specific polybutadiene-containing base rubber is compounded with an unsaturated carboxylic acid and/or a metal salt thereof and a molded and crosslinked rubber material is obtained therefrom using a crosslinking agent such as an organic peroxide, by including in the rubber composition a benzimidazole of general formula (1) or (2) below.

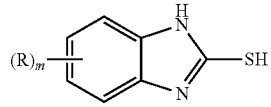

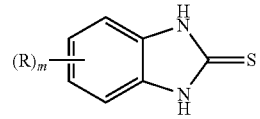

(wherein R is a hydrogen atom or a hydrocarbon group of 1 to 20 carbons, and m is an integer from 1 to 4, with the proviso that if m is 2 or more, each occurrence of R may be the same or different), the benzimidazole increases the resilience of the molded and crosslinked material and also enables the material to maintain a suitable hardness.)

Accordingly, the invention provides the following rubber composition for golf balls.

[1] A rubber composition for golf balls, comprising the following components A to C:
(A) a base rubber containing a polybutadiene having a cis-1,4 bond content of at least 60 wt %,
(B) an unsaturated carboxylic acid and/or a metal salt thereof, and
(C) a benzimidazole of general formula (1) or (2) above.
[2] The rubber composition for golf balls of [1], wherein the benzimidazole serving as component C is 2-mercaptobenzimidazole.
[3] The rubber composition for golf balls of [1], wherein the benzimidazole serving as component C is included in an amount of from 0.01 to 5 parts by weight per 100 parts by weight of component A.
[4] The rubber composition for golf balls of [1] which further comprises, as a crosslinking agent, (D) an organic peroxide.
[5] The rubber composition for golf balls of [1] which, in a molded and crosslinked form, is adapted for use as a core.

DETAILED DESCRIPTION OF THE INVENTION

The invention is described more fully below.

This invention provides a rubber composition obtained by compounding (A) a base rubber, (B) an unsaturated carboxylic acid and/or a metal salt thereof, and (C) a benzimidazole of formula (1) or (2) above. The formulation of the rubber composition is described in detail below.

Preferred use may be made of polybutadiene as the base rubber serving as component A. In particular, it is recommended that use be made of a polybutadiene having a cis-1,4 bond content on the polymer chain of at least 60 wt %, preferably at least 80 wt %, more preferably at least 90 wt %, and most preferably at least 95 wt %. If the content of cis-1,4 bonds among the bonds on the molecule is too low, the resilience may decrease.

The content of 1,2-vinyl bonds on the polybutadiene is preferably not more than 2%, more preferably not more than 1.7%, and even more preferably not more than 1.5%, of the bonds on the polymer chain. If the content of 1,2-vinyl bonds is too high, the resilience may decrease.

Rubber ingredients other than the above polybutadiene may be included in above component A within a range that is not detrimental to the advantageous effects of the invention. Examples of such rubber ingredients other than the above-described polybutadiene include other polybutadienes, and other diene rubbers, such as styrene-butadiene rubber, natural rubber, isoprene rubber and ethylene-propylene-diene rubber.

The unsaturated carboxylic acid and unsaturated carboxylic acid metal salt serving as component B is included as a co-crosslinking agent.

Examples of the unsaturated carboxylic acid include, but are not limited to, acrylic acid, methacrylic acid, maleic acid and fumaric acid. The use of acrylic acid and methacrylic acid is especially preferred.

The unsaturated carboxylic acid metal salt is exemplified by, but not limited to, the above unsaturated carboxylic acids neutralized with desired metal ions. Illustrative examples include the zinc salts and magnesium salts of methacrylic acid and acrylic acid. Zinc acrylate is especially preferred.

The amount of component B included per 100 parts by weight of the base rubber may be set to preferably at least 10 parts by weight, and more preferably at least 15 parts by weight. The upper limit in the amount included per 100 parts by weight of the base rubber may be set to preferably not more than 60 parts by weight, and more preferably not more than 45 parts by weight. If too much is included, the ball may become too hard, which may result in an unpleasant feel on impact. On the other hand, it too little is included, the rebound may decrease.

The benzimidazole serving as component C is a compound of general formula (1) or (2) below

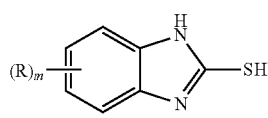

(1)

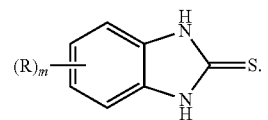

(2)

In the formula, R is a hydrogen atom or a hydrocarbon group having 1 to 20 carbons, and m is an integer from 1 to 4, with the proviso that if m is 2 or more, each occurrence of R may be the same or different.

Here, R in above formula (1) and (2) is a hydrogen atom or a hydrocarbon group having from 1 to 20 carbons. The hydrocarbon group is not subject to any particular limitation, although methyl and ethyl are especially preferred. Some or all of the hydrogen atoms on the hydrocarbon group may be substituted, the substituents being exemplified by halogen atoms and hydroxyl groups. Moreover, some or all occurrences of R in formula (1), (2) may be like or unlike.

Illustrative examples of the benzimidazole represented by above general formula (1), (2) include 2-mercaptobenzimidazole, 2-mercaptomethylbenzimidazole, 2-mercaptodimethylbenzimidazole, 2-mercaptotrimethylbenzimidazole, 2-mercaptotetramethylbenzimidazole, 2-benzimidazolethione and 5-methyl-2-benzimidazolethione. Of these, the use of 2-mercaptobenzimidazole (formula (3) below) or 2-mercaptomethylbenzimidazole (formula (4) below) is preferred.

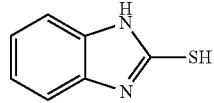

(3)

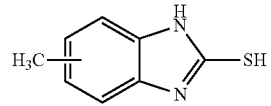

(4)

The amount of benzimidazole included as component C in the rubber composition has a lower limit of preferably 0.01 part by weight, and more preferably 0.02 part by weight, per 100 parts by weight of component A. The upper limit is preferably 5 parts by weight, more preferably 4 parts by weight, and even more preferably 2 parts by weight, per 100 parts by weight of component A. If too little component C is included, the intended effects of improving rebound and increasing the initial velocity may not be obtained. On the other hand, if too much is included, the hardness may become too low, which may result in too large a deflection or make it impossible to achieve a rebound-improving effect.

A known crosslinking agent is included in the inventive rubber composition. Although not subject to any particular limitation, in the present invention, it is preferable to use for this purpose an organic peroxide (component D). Known organic peroxides may be used as this organic peroxide. Illustrative examples include dicumyl peroxide, 1,1-di(t-butylperoxy)cyclohexane, dibenzoyl peroxide, dilauroyl peroxide and 1,1-bis(t-butylperoxy)-3,3,5-trimethylcyclohexane. These organic peroxides may be used singly or as combinations of two or more thereof. Commercial products may be used as the organic peroxide. Illustrative examples of such commercial products include those available under the trade names "Percumyl D" and "Perhexa C-40" (both from NOF Corporation), the trade names "Niper BW" and "Peroyl L" (both from NOF Corporation), and the trade name "Trigonox 29" (from Kayaku Akzo Corporation).

The amount of organic peroxide (component D) included is suitably set according to, for example, the type of organic peroxide and the molding and crosslinking conditions that are selected. Although not subject to any particular limitation, the amount included per 100 parts by weight of component A is preferably at least 0.01 part by weight, more preferably at least 0.05 part by weight, and even more preferably at least 0.1 part by weight. The upper limit is preferably not more than 15 parts by weight, more preferably not more than 10 parts by weight, and even more preferably not more than 5 parts by weight. If too little organic peroxide is included as component D, a sufficient rebound-improving effect may not be obtained. On the other hand, if too much is included, a further rebound-improving effect (especially when the ball is struck with a W#1) cannot be expected, in addition to which the ball may become too soft or the feel on impact may worsen.

In addition to above components A to D, the rubber composition of the invention may optionally include also various additives. For example, sulfur, organosulfur compounds, inert fillers, antioxidants and zinc stearate may be included.

As inert fillers, preferred use may be made of, for example, zinc oxide, barium sulfate or calcium carbonate. These may be used singly or as combinations of two or more thereof.

The amount of inert filler included per 100 parts by weight of the base rubber may be set to preferably at least 1 part by weight, and more preferably at least 5 parts by weight. The upper limit in the amount of inert filler per 100 parts by weight of the base rubber may be set to preferably not more than 200 parts by weight, more preferably not more than 150 parts by weight, and even more preferably not more than 100 parts by weight. Too much or too little inert filler may make it impossible to achieve a proper weight and a good rebound.

The antioxidant used may be a known antioxidant.

Illustrative, non-limiting, examples include the commercial products Nocrac NS-6, Nocrac NS-30, Nocrac SP-N and Nocrac 200 (all available from Ouchi Shinko Chemical Industry Co., Ltd.). These may be used singly or as a combination of two or more thereof.

The amount of antioxidant included per 100 parts by weight of the base rubber serving as component A is set to preferably not more than 5 parts by weight, and more preferably not more than 3 parts by weight. Including too much may make a good rebound and a good durability impossible to achieve.

The rubber composition of the invention forms at least some portion of an integral part of a golf ball, which golf ball may take any of various forms according to the intended purpose thereof. Illustrative examples include a one-piece golf ball formed entirely of the above rubber composition; a two-piece solid golf ball having a solid core and one cover layer, wherein at least some portion of the solid core and/or the cover is formed of the above composition; a multi-piece solid golf ball having a solid core of one, two or more layers and a cover of one, two or more layers, wherein at least some portion of the solid core and/or the cover is formed of the above composition; and a wound golf ball wherein at least some portion of the solid center and/or the cover is formed of the above composition. Of these various forms, particularly from the standpoint of taking full advantage of the properties of the composition and more effectively achieving a good golf ball rebound, a two-piece solid golf ball or a multi-piece solid golf ball having a solid core formed of the above composition is preferred.

When constructing a golf ball, examples of materials that may be used in portions of the golf ball other than the portion where the inventive rubber composition for golf balls is used include thermoplastic or thermoset polyurethane elastomers, polyester elastomers, ionomer resins, polyolefin elastomers and polyureas. One of these types may be used alone or two or more types may be used in admixture. The use of a thermoplastic polyurethane elastomer or an ionomer resin is especially preferred. The molding process used may be a known process such as injection molding or compression molding.

Commercial products may be used as the thermoplastic polyurethane elastomer. Illustrative examples include Pandex T7298, Pandex T7295, Pandex T7890, Pandex TR3080, Pandex T8295, Pandex T8290 and Pandex T8260 (available from DIC Bayer Polymer, Ltd.). Commercial products may be used as the ionomer resin as well. Illustrative examples include Surlyn 6320, Surlyn 8120 and Surlyn 9945 (available from E.I. DuPont de Nemours & Co.), and Himilan 1706, Himilan 1605, Himilan 1855, Himilan 1601 and Himilan 1557 (available from DuPont-Mitsui Polychemicals Co., Ltd.).

Polymers such as thermoplastic elastomers other than those mentioned above may be included as optional ingredients in the above material. Examples of such other polymers include polyamide elastomers, styrene block elastomers, hydrogenated polybutadienes and ethylene-vinyl acetate (EVA) copolymers.

In cases where the golf ball manufactured using the rubber composition of the invention is a one-piece golf ball or a golf ball having a solid core or a solid center, the deflection of the one-piece golf ball or the solid core or solid center, when compressed under a final load of 1,275 N (130 kgf) from an initial load state of 98 N (10 kgf), although not subject to any particular limitation, is generally at least 2.0 mm, and preferably at least 2.5 mm. The upper limit is generally not more than 6.0 mm, and preferably not more than 5.8 mm. If the deflection is too small, the feel on impact may worsen and, particularly on a long shot such as with a driver that causes a large ball deformation, the spin rate may rise excessively, resulting in a poor distance. On the other hand, if the one-piece golf ball or the solid core or solid center is too soft, the ball may have a deadened feel on impact and the rebound may be inadequate, possibly resulting in a poor distance, or the durability of the ball to cracking on repeated impact may worsen.

Here, the diameter of the solid core, although not subject to any particular limitation, may be set to generally at least 20 mm, and preferably at least 30 mm. The upper limit may be set to generally not more than 42.5 mm, and preferably not more than 42.3 mm.

The specific gravity of the solid core, although not subject to any particular limitation, may be set to generally at least 0.7, and preferably at least 0.9. The upper limit may be set to generally not more than 1.6, and preferably not more than 1.4.

The thickness per cover layer formed of the inventive golf ball composition and the above-mentioned materials, although not subject to any particular limitation, may be set to generally at least 0.1 mm, and preferably at least 0.2 mm. The upper limit may be set to generally not more than 4 mm, and preferably not more than 3 mm.

In cases where the rubber composition of the invention is used to produce one-piece golf balls, two-piece solid golf balls and multi-piece solid golf balls, production may be carried out by effecting vulcanization and curing in the same way as with conventional rubber compositions for golf balls. The vulcanization conditions are exemplified by a vulcanization temperature of from 100 to 200° C. and a vulcanization time of from 10 to 40 minutes.

When a golf ball is manufactured using the rubber composition of the invention, the diameter of the ball may be set to not less than 42 mm, and in particular, according to the Rules of Golf for competitive play, preferably not less than 42.67 mm. The upper limit may be set to not more than 45 mm, and preferably not more than 44 mm. The weight may be set to not more than 48 g, and in particular, according to the Rules of Golf for competitive play, preferably not more than 45.93 g. The lower limit may be set to not less than 40 g, and preferably not less than 44 g.

As described above, the rubber composition for golf balls of this invention enables a high-quality molded and crosslinked product having a suitable hardness and a high resilience to be obtained. In particular, by employing this rubber composition as the material for a one-piece golf ball or as the solid core material in a multilayer solid golf ball, a high initial velocity, an increased distance, and a good feel on impact can be obtained.

EXAMPLES

Examples of the invention and Comparative Examples are given below by way of illustration, and not by way of limitation.

Examples 1 to 6, Comparative Example 1

Formation of Core

Rubber compositions were formulated as shown in Table 1, then molded and vulcanized at 155° for 20 minutes to form cores having the diameters and weights shown in the table. Ingredient amounts in the table are indicated in parts by weight.

TABLE 1

|  | Comparative Example | Example | | | | | |
| --- | --- | --- | --- | --- | --- | --- | --- |
|  | 1 | 1 | 2 | 3 | 4 | 5 | 6 |
| BR730 | 100 | 100 | 100 | 100 | 100 | 100 | 100 |
| Zinc oxide | 22 | 22 | 22 | 22 | 22 | 22 | 22 |
| Zinc acrylate | 30 | 30 | 30 | 30 | 30 | 30 | 30 |
| Nocrac NS-6 | 0.1 | | | | | | |
| Nocrac MB | | 0.02 | 0.04 | 0.30 | 0.44 | 0.50 | 1.00 |
| Percumyl D | 0.3 | 0.3 | 0.3 | 0.3 | 0.3 | 0.3 | 0.3 |
| Perhexa C-40 | 0.3 | 0.3 | 0.3 | 0.3 | 0.3 | 0.3 | 0.3 |
| Diameter, mm | 38.4 | 38.5 | 38.6 | 38.6 | 38.5 | 38.6 | 38.5 |
| Weight, g | 35.4 | 35.4 | 35.6 | 35.6 | 35.5 | 35.5 | 35.6 |
| Deflection, mm | 3.11 | 2.86 | 2.69 | 2.89 | 2.61 | 2.93 | 2.76 |
| Initial velocity, m/s | — | +0.41 | +0.26 | +0.24 | +0.27 | +0.20 | +0.17 |

Details on the materials in Table 1 are given below.

BR730: A polybutadiene available from JSR Corporation; cis-1,4 bond content, 95% (published value from JSR Corporation)

Zinc oxide: Available from Sakai Chemical Co., Ltd.

Zinc acrylate: Available from Nihon Jyoryu Kogyo Co., Ltd.

Nocrac NS-6: An antioxidant available from Ouchi Shinko Chemical Industry Co., Ltd.; 2,2'-methylenebis(4-methyl-6-t-butylphenol)

Nocrac MB: 2-Mercaptobenzimidazole, available from Tokyo Chemical Industry Co., Ltd.

Percumyl D: An organic peroxide available from NOF Corporation; dicumyl peroxide Perhexa C-40: An organic peroxide available from NOF Corporation; 1,1-di(t-butylperoxy)cyclohexane, 40% concentration The deflections and initial velocities of the respective cores obtained were evaluated by the following methods. The results are shown in Table 1.

(1) Core Deflection (mm)

The deflection (mm) of the core when compressed at a temperature of 23±1° C. and a rate of 10 mm/s under a final load of 1,275 N (130 kgf) from an initial load state of 98 N (10 kgf) was measured.

(2) Core Initial Velocity Test (m/s)

The initial velocity of the core was measured using an initial velocity measuring apparatus of the same type as the USGA drum rotation-type initial velocity instrument approved by the R&A. The core was held isothermally at a temperature of 23±1° C. for at least 3 hours, then tested in a room temperature (23±2° C.) chamber. The differences relative to the core in Comparative Example 1 are shown in Table 1.

The results shown in Table 1 confirmed that the molded and crosslinked products (cores) obtained from the 2-mercaptobenzimidazole-containing rubber compositions of Examples 1 to 6 exhibited a higher resilience and were capable of achieving a higher core initial velocity than the rubber composition of Comparative Example 1, which did not contain 2-mercaptobenzimidazole.

the invention claimed is:

1. A rubber composition for golf balls, comprising the following components A to C:
   (A) a base rubber containing a polybutadiene having a cis-1,4 bond content of at least 60 wt %,
   (B) an unsaturated carboxylic acid and/or a metal salt thereof, and
   (C) 2-mercaptobenzimidazole in an amount of from 0.01 to 5 parts by weight per 100 parts by weight of component A.

2. The rubber composition for golf balls of claim 1 which further comprises, as a crosslinking agent, (D) an organic peroxide.

3. The rubber composition for golf balls of claim 1 which, in a molded and crosslinked form, is adapted for use as a core.

* * * * *